US009119180B2

(12) United States Patent
Palin et al.

(10) Patent No.: US 9,119,180 B2
(45) Date of Patent: Aug. 25, 2015

(54) TRANSPORT INDEPENDENT ARCHITECTURE

(75) Inventors: Arto Palin, Viiala (FI); Juha-Matti Tuupola, Tampere (FI); Timo Eriksson, Espoo (FI)

(73) Assignee: Nokia Corporation, Espoo (FI)

( * ) Notice: Subject to any disclaimer, the term of this patent is extended or adjusted under 35 U.S.C. 154(b) by 108 days.

(21) Appl. No.: 12/920,004

(22) PCT Filed: Feb. 27, 2008

(86) PCT No.: PCT/IB2008/050708
§ 371 (c)(1),
(2), (4) Date: Aug. 27, 2010

(87) PCT Pub. No.: WO2009/106930
PCT Pub. Date: Sep. 3, 2009

(65) Prior Publication Data
US 2011/0004886 A1    Jan. 6, 2011

(51) Int. Cl.
| G06F 15/16 | (2006.01) |
| H04W 76/02 | (2009.01) |
| H04L 29/08 | (2006.01) |
| H04W 8/26 | (2009.01) |
| H04W 48/18 | (2009.01) |
| H04W 74/00 | (2009.01) |

(52) U.S. Cl.
CPC ............ *H04W 76/021* (2013.01); *H04L 67/16* (2013.01); *H04W 8/26* (2013.01); *H04W 48/18* (2013.01); *H04W 74/00* (2013.01)

(58) Field of Classification Search
USPC .......................................................... 709/229
See application file for complete search history.

(56) References Cited

U.S. PATENT DOCUMENTS

| 5,491,693 | A | * | 2/1996 | Britton et al. ................. 370/401 |
| 5,548,723 | A | * | 8/1996 | Pettus .......................... 709/228 |
| 5,822,598 | A |   | 10/1998 | Lam |
| 6,148,377 | A |   | 11/2000 | Carter et al. |
| 6,247,057 | B1 | * | 6/2001 | Barrera, III ................... 709/229 |
| 6,601,093 | B1 |   | 7/2003 | Peters |
| 6,604,140 | B1 |   | 8/2003 | Beck et al. |

(Continued)

FOREIGN PATENT DOCUMENTS

| CN | 1574796 | 2/2005 |
| CN | 1622545 | 6/2005 |

(Continued)

OTHER PUBLICATIONS

International Search Report and Written Opinion for corresponding Patent Cooperation Treaty Application No. PCT/ IB2008/050711, dated Feb. 2, 2009, 14 pages.

(Continued)

*Primary Examiner* — Jeffrey R Swearingen
(74) *Attorney, Agent, or Firm* — Locke Lord LLP

(57) ABSTRACT

A system for automating connection management in a manner that may be transparent to any actively communicating applications operating in a Network on Terminal Architecture (NoTA). An application level entity, such as an application node, may access another node by making a request to a high level communication structure via a high level interface. The high level structure may then interact with a lower level structure in order to facilitate a connection to a programmatic element on another device, for example, via a wireless communication transport.

18 Claims, 11 Drawing Sheets

(56) References Cited

U.S. PATENT DOCUMENTS

| | | | |
|---|---|---|---|
| 6,879,561 | B1 | 4/2005 | Zhang et al. |
| 6,909,721 | B2 | 6/2005 | Ekberg et al. |
| 7,110,405 | B2 | 9/2006 | Divivier |
| 7,352,998 | B2 | 4/2008 | Palin et al. |
| 7,590,097 | B2 | 9/2009 | Ekberg et al. |
| 7,668,565 | B2 | 2/2010 | Ylanen et al. |
| 7,697,893 | B2 | 4/2010 | Kossi et al. |
| 2001/0025321 | A1* | 9/2001 | Tang et al. ............ 709/246 |
| 2001/0051981 | A1* | 12/2001 | Davison et al. ............ 709/203 |
| 2002/0009079 | A1* | 1/2002 | Jungck et al. ............ 370/389 |
| 2003/0100308 | A1 | 5/2003 | Rusch |
| 2003/0236890 | A1 | 12/2003 | Hurwitz et al. |
| 2004/0019640 | A1 | 1/2004 | Bartram et al. |
| 2005/0003822 | A1 | 1/2005 | Aholainen et al. |
| 2005/0013259 | A1 | 1/2005 | Papoushado et al. |
| 2005/0066033 | A1 | 3/2005 | Cheston et al. |
| 2005/0071879 | A1 | 3/2005 | Haldavnekar et al. |
| 2005/0097087 | A1 | 5/2005 | Punaganti Venkata et al. |
| 2005/0114448 | A1 | 5/2005 | Skomra et al. |
| 2005/0117514 | A1 | 6/2005 | Iwata et al. |
| 2005/0138173 | A1 | 6/2005 | Ha et al. |
| 2005/0193056 | A1* | 9/2005 | Schaefer et al. ............ 709/203 |
| 2005/0193106 | A1 | 9/2005 | Desai et al. |
| 2005/0254472 | A1 | 11/2005 | Roh et al. |
| 2006/0140146 | A1 | 6/2006 | Funk et al. |
| 2006/0259606 | A1 | 11/2006 | Rogers et al. |
| 2007/0058630 | A1 | 3/2007 | Fujimoto |
| 2007/0141984 | A1 | 6/2007 | Kuehnel |
| 2007/0180073 | A1 | 8/2007 | Paul et al. |

FOREIGN PATENT DOCUMENTS

| | | |
|---|---|---|
| CN | 1633097 A | 6/2005 |
| CN | 1753406 | 3/2006 |
| CN | 1758604 | 4/2006 |
| CN | 1819588 | 8/2006 |
| CN | 1949697 | 4/2007 |
| CN | 1949698 | 4/2007 |
| EP | 1484703 | 12/2004 |
| EP | 1542409 A | 6/2005 |
| EP | 1758312 A1 | 2/2007 |
| EP | 1858210 A1 | 11/2007 |
| WO | 2004008793 A | 1/2004 |
| WO | 2007095966 A1 | 8/2007 |

OTHER PUBLICATIONS

Sttenkiste, "A Systematic Approach to Host Interface Design for High Speed Networks", Computer, IEEE Service Center, Los Alamitos, CA, US, vol. 27, No. 3, Mar. 1994, pp. 47-57.

Kliazovich et al., "A Delayed-ACK Scheme for MAC-Level Performance Enhancement of Wireless LANs", Telecommunications and Networking—ICT 2004; [Lecture Notes in Computer Science; ; LNCS], Springer-Verlag, Berlin/Heidelberg, vol. 3124, Jul. 2004, pp. 1289-1295.

International Search Report and Written Opinion of the International Searching Authority for PCT/IB2008/050709, dated Feb. 25, 2009, 18 pages.

Eriksson et al., "Providing Quality of Service in Always Best Connected Networks", IEEE Communicaitons Magazine, IEEE Service Center, Piscataway, US, vol. 41, No. 7, Jul. 2003, pp. 154-163.

Suoranta et al., "New Directions in Mobile Device Architectures", Digital System Design: Architectures, Methods and Tools, 2006. DSD 200 6, 9th Euromicro Conference on IEEE PI, Jan. 2006, pp. 17-26.

International Search Report and Written Opinion of the International Searching Authority for corresponding Patent Cooperation Treaty Application No. PCT/IB2008/050708 dated Mar. 3, 2009, 17 pages.

Lee et al., "Protocols for Service Discovery in Dynamic and Mobile Networks", International Journal of Computer Research, vol. 11, No. 1, 2002, pp. 1-12.

The Salutation Corsortium, "Salutation Architecture Specification (Part 1), Version 2.1" Salutation Architecture Specification, XX, XX, Dec. 31, 1999, i-v, 1.

Suoranta et al., "New Directions in Mobile Device Architectures", Digital System Design: Architectures, Methods and Tools, 2006. DSD 200 6. 9th Euromicro Conference on, IEEE, PI, Jan. 1, 2006, pp. 17-26.

Lapetelainen et al., "Networked Systems, Services and Information", NOTA2008, 1st International network on Terminal Architecture Conference, Jun. 11, 2008, pp. 1-7.

Kronlof et al., "Advances in Design and Specification Languages for Embedded Systems", Jul. 19, 2007, Springer, Netherlands.

Desoli et al., "An Outlook on the Evolution of Mobile Terminals: From monolithic to modular multiradio, multiapplication platforms", IEEE Circuits and Systems Magazine, IEEE Service Center, New York, vol. 6, No. 2, Jan. 1, 2006, pp. 17-29.

Dobrev et al., "Device and Service Discovery in Home Networks with OSGi", In-Home Networking, IEEE Communications Magazine, Aug. 2002, 7 pages.

Miaoqing, "Service Discovery between Multiple Home Networks", TKK T-110.5190 Seminar on Internetworking, Mar. 4-5, 2007.

International Search Report and Written Opinion of the International Searching Authority for corresponding Patent Cooperation Treaty Application No. PCT/IB2007/054550 dated Oct. 15, 2008, 12 pages.

Se Gi Hong, et al: "Accelerating Service Discovery in Ad-Hoc Zero Configuration Networking" Global Telecommunications Conference, 2007. GLOBECOM '07. IEEE, IEEE, Piscataway, NJ, USA, Nov. 1,2007, pp. 962-965, XP031196113 ISBN: 978-1-4244-1042-2, section II.

Celeste Campo, et al: "DNS-Based Service Discovery in Ad Hoc Networks: Evaluation and Improvements" Personal Wireless Commnications Lecture Notes in Computer Science; LNCS, Springer Berlin, DE, vol. 4217, Jan. 1, 2006, pp. 111-122, XP019044018 ISBN: 978-3-540-45174-7, section 2.

Stuart Cheshire; Marc Krochmal, Apple Computer, et al: "DNA-Based Service Discovery; draft-cheshire-dnsext-dnssd-04.text" IETF Standard-Working-Draft, Internet Engineering Task Force, IETF, CH, No. 4, Aug. 10, 2006, XP015046478 ISSN: 0000-0004, section 14.

International Search Report and Written Opinion for PCT/IB2008/053759 dated Mar. 27, 2009, 15 pages.

Quiroz, et al., "Version vectors based synchronization engine for mobile devices", Proceeding PDCN'07 Proceedings of the 25th conference on Proceedings of the 25th IASTED International Multi-Conference: parallel and distributed computing and networks 2007.

Final Technology Evaluation Report SIRENA Service Infrastructure for Real-time Embedded Networked Applications ITEA 02014 Project Reference WP2/110 Version V1.0 Author(s) / Organisation SIRENA Consortium Date May 14, 2004.

Lent, R.; "Smart packet-based selection of reliable paths in ad hoc networks" Design of Reliable Communication Networks, 2005. (DRCN 2005). Proceedings.5th International Workshop on Oct. 16-19, 2005 Page(s):5 pp.

International Search Report and Written Opinion for PCT/FI2008/050242, dated Aug. 18, 2008, 12 pages.

Raverdy et al., "Efficient Context-aware Service Discovery in Multi-Progtocol Pervasive Environments", Mobile Data Management, 7th International Conference, Conference Proceedings Article, IEEE, May 10, 2006.

Raverdy et al., "A Multi-Protocol Approach to Service Discovery and Acces in Pervasive Environments", Mobile and Ubiquitous Systems: Networking & Services, 2006 Third Annual International Conference on Jul. 2006, IEEE 2006, pp. 1-9.

Kim et al., "Service Discovery Using FIPA-Compliant AP to Support Scalability in Ubiquitous Environments", Proceedings of the Fourth Annual ACIS International Conference on Computer and Information Science on 2005, pp. 647-652.

Scholten et al., "Secure Service Discovery in Home Networks", International Conference on Consumer Electronics, 2006, ICCE '06, 2006 Digest of Technical Papers, 7-11, Jan. 2006, pp. 115-116.

International Search Report and Written Opinion for PCT/IB2008/052437, dated May 1, 2009, 14 pages.

Office Action from European Patent Application No. 08776431.2, dated Aug. 2, 2010, 6 pages.

(56) References Cited

OTHER PUBLICATIONS

Rekimoto et al., "A Multiple Device Approach for Supporting Whiteboard-Based Interactions", Chi '98. Human Factors in Computing Systems, Conference Proceedings, Los Angeles, CA, Apr. 18-23, 1998.

Frank et al, "A Customizable Shared Information Space to Support Concurrent Design", Computers in INdustry, Elsevier Science Publishers, Amsterdam, NL, vol. 48, No. 1, May 1, 2002, pp. 45-57.

Tandler, "Software Infrastructure for Ubiquitous Computing Environments: Supporting Synchronous Collaboration with Heterogeneous Devices", Lecture Notes in Computer Science, LNCS, vol. 2201/2001, Jan. 1, 2001, pp. 95-115.

Steenkiste, P. A., "A Systematic Approach to Host Interface Design for High-Speed Networks", Computer, IEEE Service Center, Mar. 1994, pp. 47-57 and pp. 12-13.

English Language Machine Translation of Chinese Patent Application Publication No. CN1574796—12 pages.

English Language Machine Translation of Chinese Patent Application Publication No. CN1622545—12 pages.

\* cited by examiner

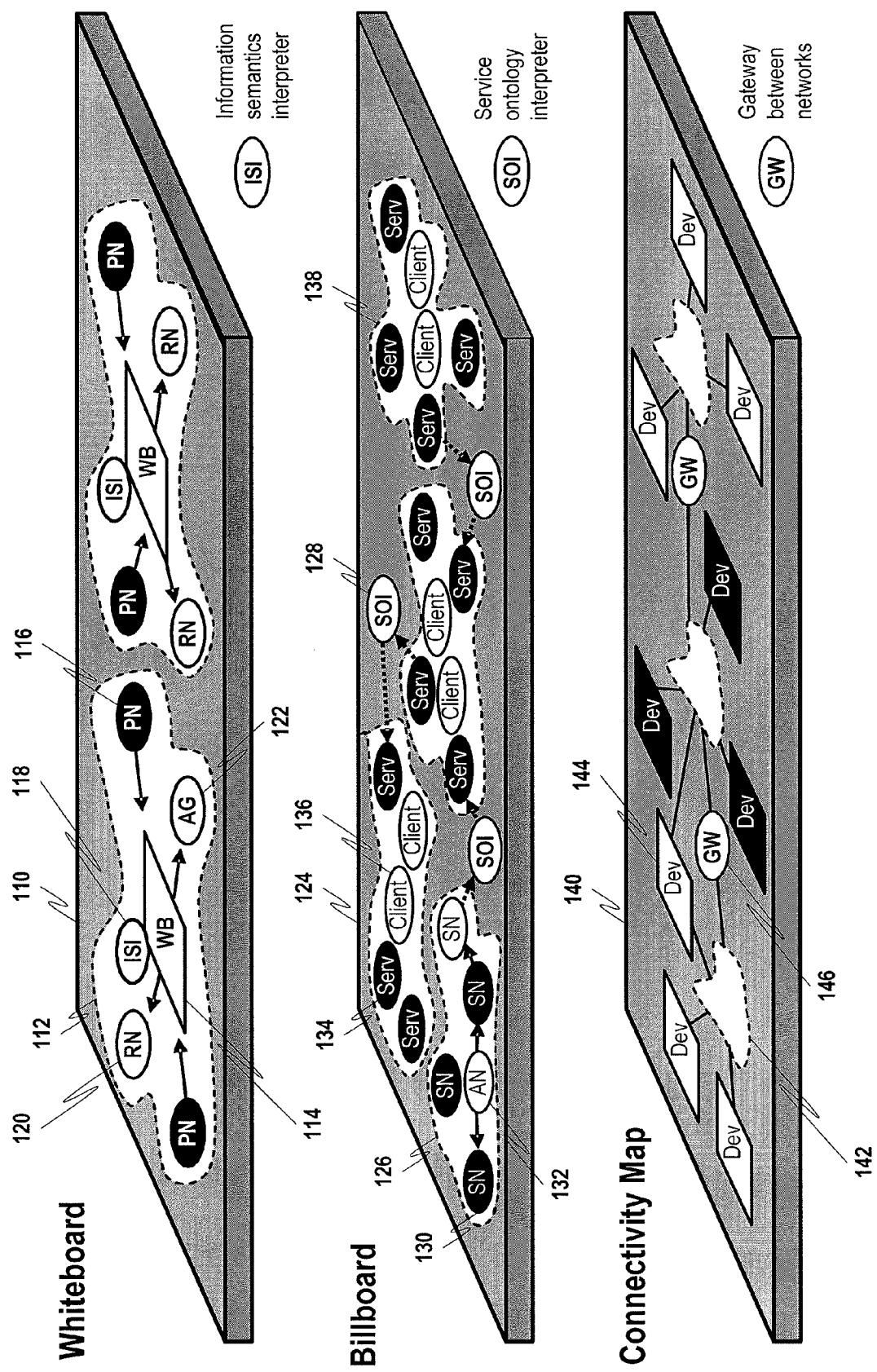

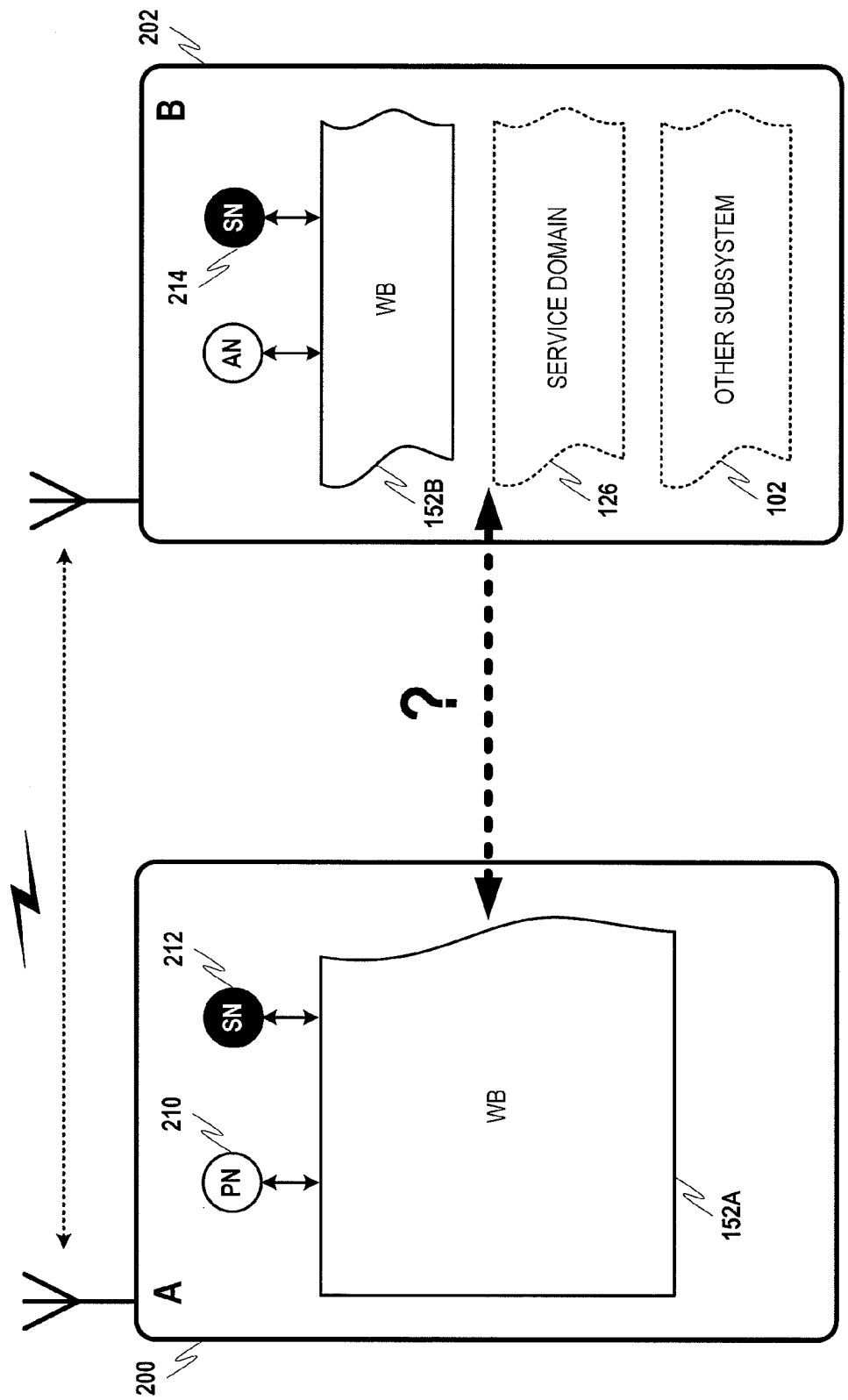

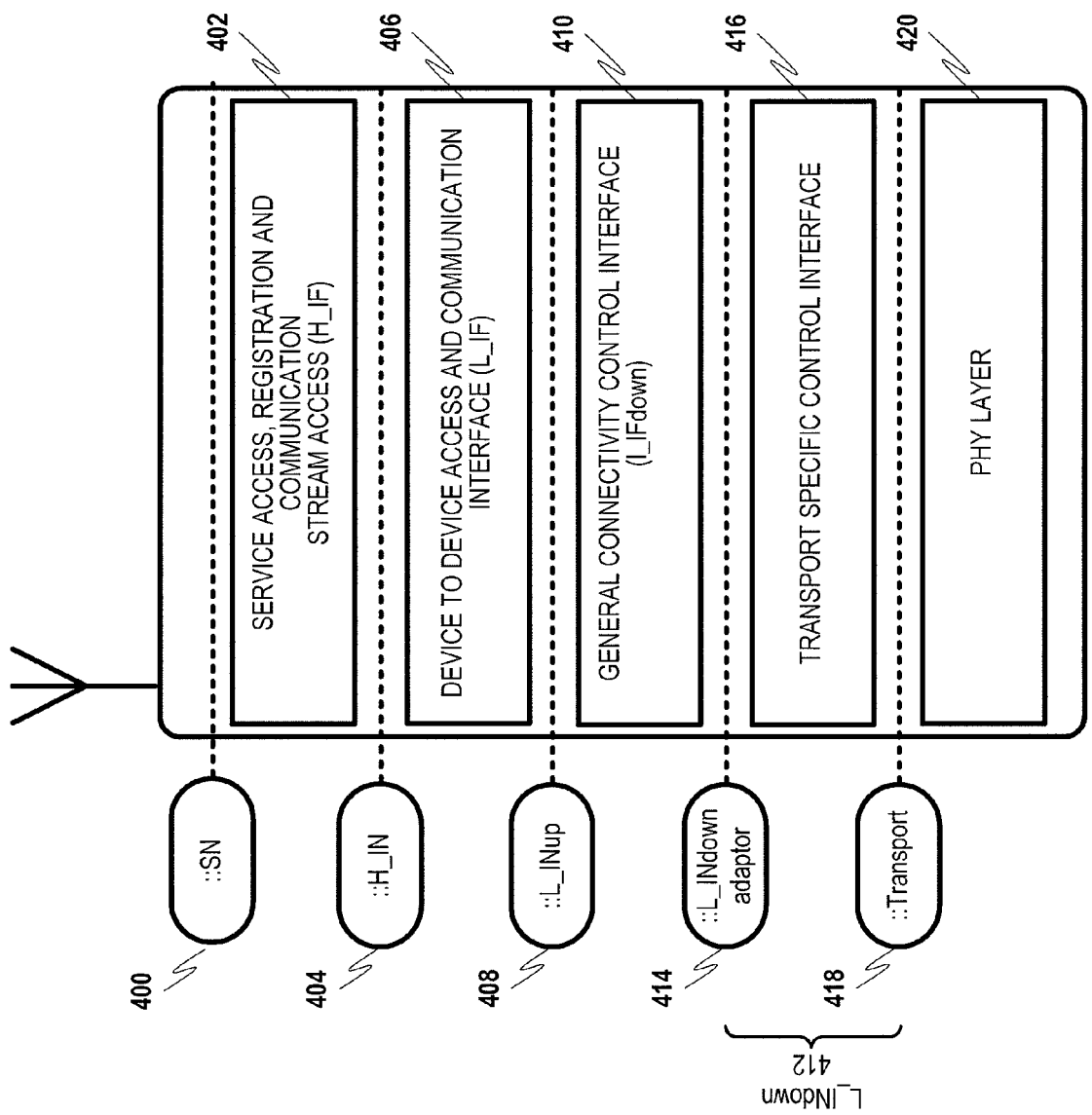

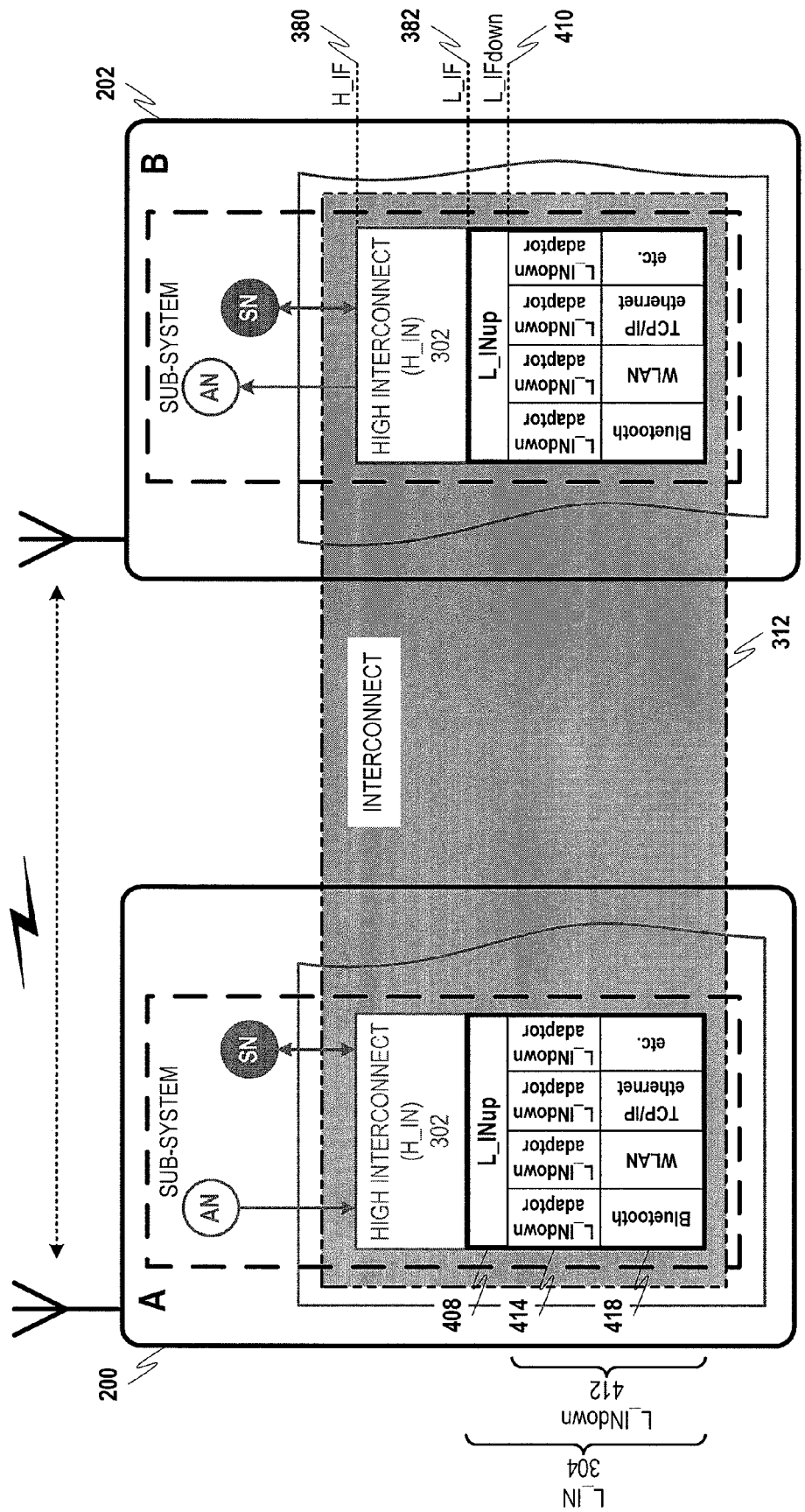

TRANSPORT INDEPENDENT ARCHITECTURE

RELATED APPLICATION

This application was originally filed as PCT Application No. PCT/IB2008/050708 filed Feb. 27, 2008.

BACKGROUND OF INVENTION

1. Field of Invention

The present invention relates to inter-device architecture, and more specifically, to an architecture for establishing connectivity between devices using one or more wired and/or wireless transports.

2. Background

In general, software programs may include instruction sets that are executable by a processor, and are further organized to receive input (e.g., data) for use in a calculation or determination resulting in an output. Software technology has evolved to transform these individual instruction sets into program modules that may in turn be integrated together to form more complex programs. Today's more-sophisticated software programs may receive various forms of input such as raw data, for example as stored in magnetic or optical storage, user input through various known types of user interfaces, measured or monitored information converted to electronic information from electronic and/or electromechanical sensors, etc.

In some instances, programs may be configured to produce data usable by other software applications. However, a problem may be presented in conveying the information from one program to another. If the relationship is known before the programs are created, then a specific strategy may be devised to convert one program's output into another program's input. Traditionally this strategy has led to functional but rigid software applications, requiring frequent and possibly substantial revisions due to changes in functionality, platform, architecture, etc.

Recently, more flexible modular architectures for sharing information amongst programs are emerging. These programs use modular program units, or "nodes," that can be revised or replaced without having to interrupt overall device operation. In particular, some nodes may contribute information to a shared memory space, while others may read previously stored information from the shared memory space or may combine these functions. Other types of nodes may also be specialized to provide communication services. Using this strategy, altering program elements (e.g., altering, adding or deleting one or more nodes) may not affect nodes that are actively communicating with other nodes, and memory usage may be optimized since information may be stored in a single location while being accessible to all of the nodes.

While this strategy can conceptually be implemented in a single device platform, no effective solution currently exists for coupling nodes on different devices. Problems currently exist with respect to facilitating the establishment of a transport (e.g., a wireless communication medium) with which one node may correspond with another. Further, if a selected transport becomes unavailable, for example, because of environmental interference, range and or traffic issues, then under the application of current practices a whole new connection configuration would have to be devised. Alternatively, solutions may now exist that utilize strategies for rolling one transport to another if problems occur, but again this would require a configuration that would limit operation to a specifically defined action. The management of active transports to facilitate inter-program communication, as well as inter-device connectivity, in a manner that conveys data while being completely transparent at the application level does not currently exist.

SUMMARY

The present invention may include at least a method, computer program, device and system for automating connection management in a manner that may be transparent to any actively communicating applications operating, for example, in a Network on Terminal Architecture (NoTA). An application level entity, such as an application node, may access another node by making a request to a high level communication structure via a high level interface. The high level structure may then interact with a lower level structure in order to facilitate a connection to a programmatic element on another device, for example, via a wireless communication transport.

In at least one embodiment of the present invention, the high level communication structure may be transport-independent. This high level communication structure may utilize a low-level interface in order to pass a communication establishment request to a low-level communication structure. The low level communication structure may then establish a wireless connection utilizing a wireless transport, and may further manage the wireless connection. Management may include, for example, automatically reestablishing the connection if it becomes disconnected, automatically changing to a new transport, or utilizing more than one wireless transport simultaneously without any configuration change at the application level.

The lower level communication structure may, in accordance with various configurations of the present invention, include at least an up structure and a down structure. The up structure may be transport independent so as to provide a single interface for conveying data to the higher level communication structure. On the other hand, the down structure may be transport specific, and may consist of an interface or "adaption" corresponding to each supported transport. The down structure may facilitate a wireless connection with its corresponding transport, and adapt the information provided by the transport for use by the up level. The up level may then pass the information from the down level to the high level communication structure via the low level interface, which is then conveyed to the application level. This process may further occur in reverse when the application wishes to send information.

DESCRIPTION OF DRAWINGS

The invention will be further understood from the following detailed description of various exemplary embodiments, taken in conjunction with appended drawings, in which:

FIG. 1B discloses a structural diagram of various exemplary layers of an inter-device Network on Terminal Architecture (NoTA) including a Whiteboard-type exchange service in accordance with at least one exemplary embodiment of the present invention.

FIG. 2 discloses an exemplary need for underlying connectivity establishment in accordance with at least one exemplary embodiment of the present invention.

FIG. 4 discloses an example of various software levels and interfaces through which information may be conveyed in accordance with at least one exemplary embodiment of the present invention.

FIG. 5 discloses an exemplary configuration for the lower level communication structure in accordance with at least one exemplary embodiment of the present invention.

DESCRIPTION OF EXEMPLARY EMBODIMENTS

While the invention has been described below in a multitude of exemplary embodiments, various changes can be made therein without departing from the spirit and scope of the invention, as described in the appended claims.

I. Network on Terminal Architecture (NoTA)

Network on Terminal Architecture (NoTA) is a service based interconnect-centric platform architecture usable in various electronic apparatuses including wired and/or wireless (e.g., mobile) devices. The interconnect-centric approach incorporated in NoTA may allow any physical sub-system to directly communicate with other sub-systems while supporting multiple parallel connections. Direct connections are possible due to simple switches optimized for the underlying physical media. NoTA interconnect architecture and related interfaces may be complexity and performance optimized for service and data communication, and may be designed in such a way that different communication media technologies can be utilized.

Figure 1A:
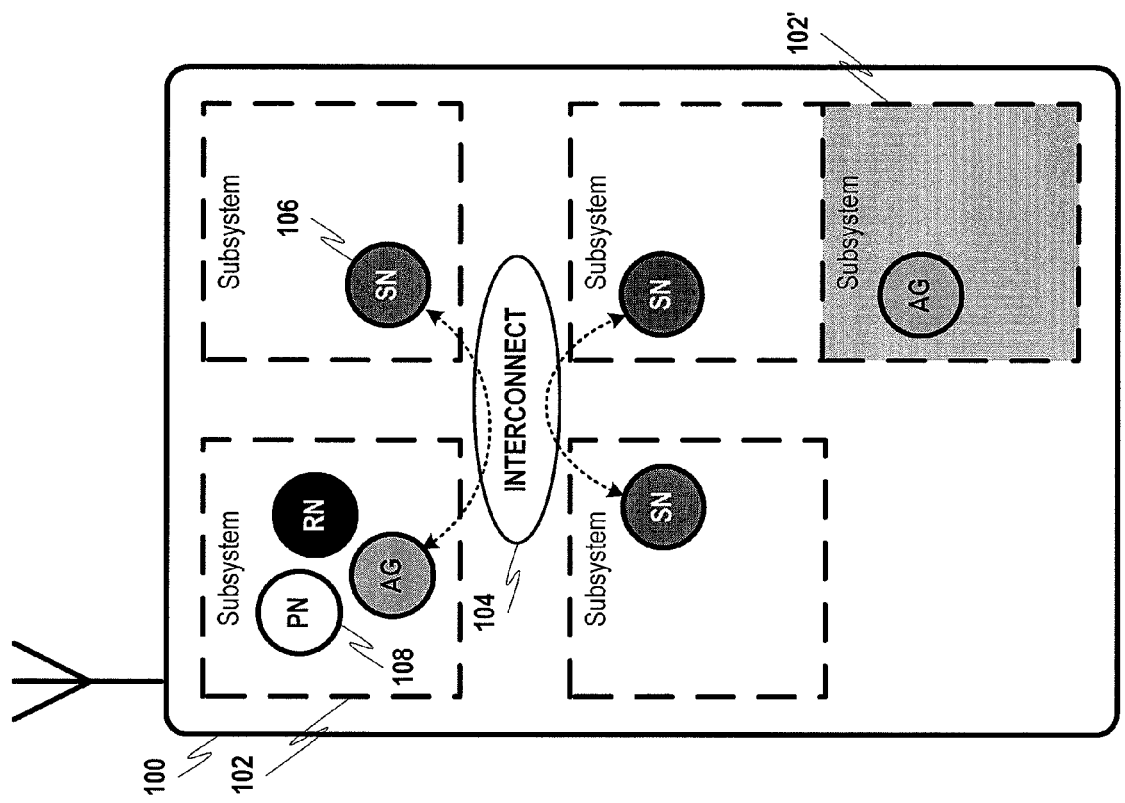
FIG. 1A discloses an exemplary intra-device Network on Terminal Architecture (NoTA) in accordance with at least one exemplary embodiment of the present invention.

FIG. 1A discloses an example of NoTA implemented in a single device 100. The NoTA platform architecture consists of subsystems 102 connected together via interconnects as shown, for example, at 104. It is also possible for subsystems to be directly coupled to other subsystems as shown at 102' in FIG. 1A. A coupled configuration may exist in a scenario where subsystems frequently cooperate during operation. FIG. 1A also discloses service nodes (SN) 106 and application nodes (AN) 108 (e.g., PN, RN and AG) that may be mapped into subsystems 102 and 102'. Subsystems in NoTA context may encompass all of the resources (e.g., computing, software, peripherals, etc.) required to implement the services and/or applications running in the corresponding subsystem.

Now referring to FIG. 1B, a more detailed disclosure of NoTA as it may be applied to a multiple-device system, in accordance with at least one embodiment, is now disclosed. The general architecture may be explained in terms of three exemplary operational levels: whiteboard 110, billboard 122 and connectivity map 140. Whiteboard 100 is an example of an application and service level that may comprise the highest level of operation in this architecture. At this level, operational groups 112 may be formed including whiteboards 114 and various application nodes 108. Application nodes 108 may correspond to application existing on a plurality of wireless communication devices, and may be utilized to exchange information between these applications, for example, by placing data into, and removing data from, whiteboard 114. For example, the various nodes may consist of proactive nodes (PN) 116 that may place information into whiteboard 114, reactive nodes (RN) 120 that may take information from whiteboard 114 and agent nodes (AG) 122 that may operate either in a PN or RN mode depending on the particular application. Information semantics interpreter (ISI) 118 may be utilized to link different whiteboards 114 together. Utilizing these constructs, whiteboard 114 may provide a standardized means for application interaction that overcomes many incompatibilities.

Billboard level 124 may facilitate interaction between services available on the one or more devices. Services 134 and clients 136 that may utilize these services may be organized in service domains 126. In at least one scenario, service domains 126 may correspond to a particular protocol, such as UPnP, BT SDP, Bonjour, etc. In each service domain 126, services 134 may be represented by service nodes (SN) 130, and likewise, application nodes (AN) 132 may be established to correspond to applications. Further, service domains 126 may interact utilizing service ontology interpreters (SOI) 128. SOT 128 may allow service domains 126 to interact with other service domains (e.g., 138), even if service domain 138 resides on another wirelessly-linked device (e.g., to provide access information to service domains 126).

Connectivity map 144 may define connectivity methods/possibilities and topology for different devices participating in sharing resources in order to support a top level, for example whiteboard 110, and also billboard-type services in billboard level 122. In at least one exemplary embodiment of the present invention, devices 144 may be linked in directly connected groups 142. Examples of directly connected groups of devices (Dev) 142 may include devices connected via Bluetooth™ piconet, a WLAN network, a wUSB link, etc. Each directly connected group of devices 142 may further be linked by gateways (GW).

II. Underlying Communication Elements that May Couple Subsystems

While examples of inter-node interaction involving application and/or service nodes has been described, no detailed discussion regarding how the devices may be coupled via wired or wireless communication, or the management of this connection, has been offered. FIG. 2 discloses an example scenario wherein application and/or service nodes may reside on two different devices 200 and 202. Whiteboard sections 152A and 152B also reside on these devices, respectively, ideally providing a common memory space via which the nodes may interact. However, interaction with a common memory space in the form of whiteboard 152 may initially depend upon the establishment a wireless connection between whiteboard sections 152A and 152B.

While an exemplary whiteboard 152 divided into two sections 152A and 152B has been utilized for the sake of explanation in the present disclosure, the facilitation of node interaction is not specifically limited to this scenario. For example, while proactive node (PN) 210 coupled to whiteboard section 152A may utilize SN 212 and 214 to interact with whiteboard section 152B as shown in FIG. 2, it is further conceivable that whiteboard 152A may allow PN 210 access to other shared memory spaces, such as service domain 126 (e.g., to allow an application to access a desired service, like a printer service), or any other exemplary subsystem 102 as previously discussed in accordance with various embodiments of the present invention. Regardless of the node/device configuration, interaction between nodes may not be problematic on a single device in view of the locally interconnected subsystems. However, this interaction may become more difficult with multiple devices linked, for example, over one or more wireless transports.

Figure 3A:
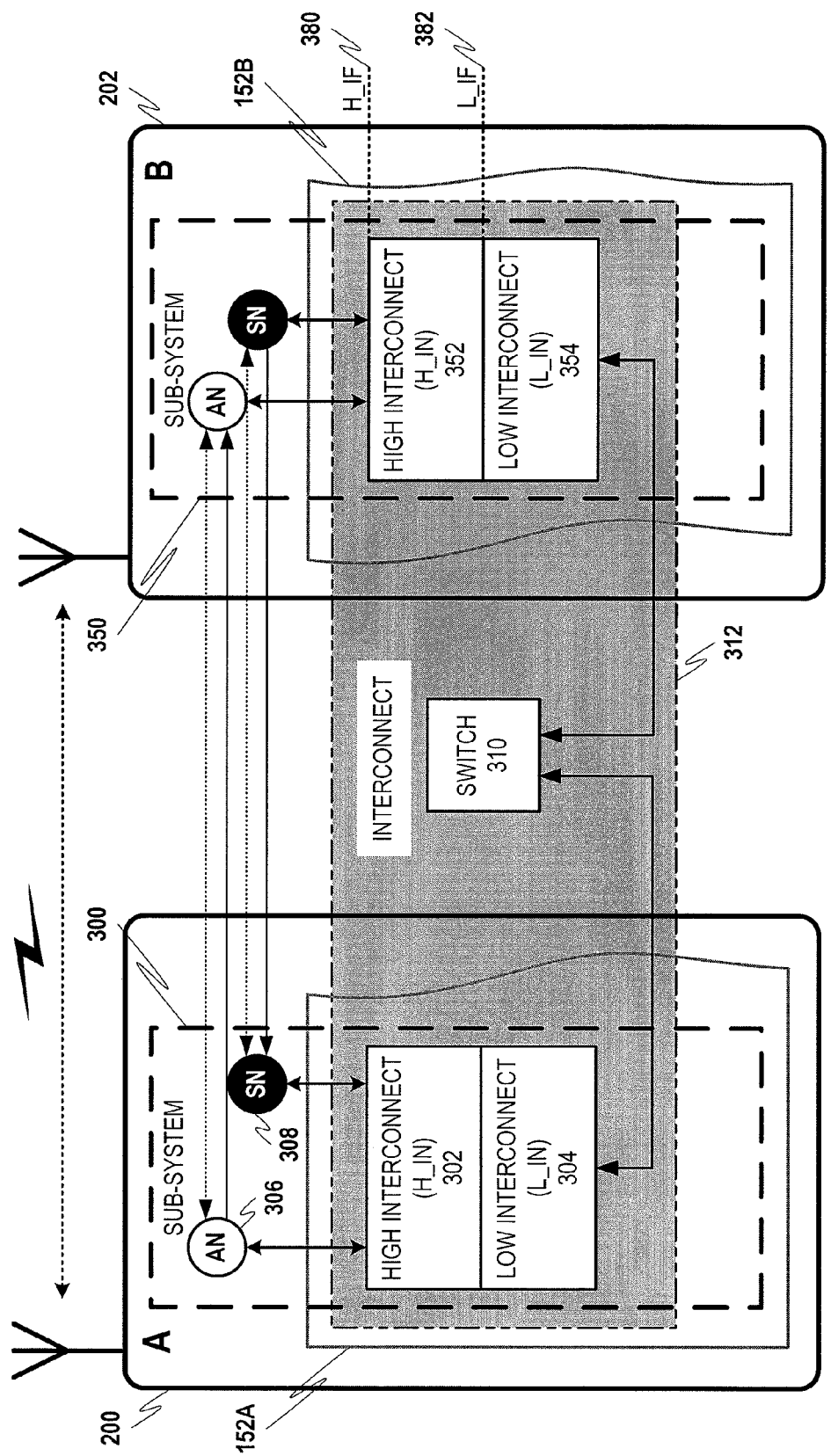
FIG. 3A discloses a structural example of communication establishment in accordance with at least one exemplary embodiment of the present invention.

FIG. 3A discloses an example of an underlying logical architecture that may be utilized in implementing NoTA in accordance with at least one exemplary embodiment of the present invention. NoTA may be configured as multiple subsystems (e.g., 300 and 350) coupled by interconnect 312. As previously set forth, a communication link between devices that may be both established and managed by a lower operational level may facilitate the routing of messages for higher level subsystems, such as sections (152A and 152B) of the same shared memory space (whiteboard) 152, without the actual involvement of the higher levels in any communication configuration. NoTA interconnect 312 may comprise two layers: High Interconnect (H_IN) layer 302 and Low Interconnect (L_IN) layer 304 coupled to corresponding H_IN 352 and L_IN 354 by switch 310. The various communication layers may further interact over interfaces (abbreviated "IF" in FIG. 3). For example, H_IF 380 may serve as the interface between the application level and H_IN 302/352, while L_IF 382 may serve as the interface between H_IN 302/352 and L_IN 304/354. Low interconnect layer 304 may include ISO/OSI layers L1-L4 and may provide transport socket type interface upwards. High Interconnect layer 302 may act as the middleware between L_IN 304 and the higher level Application nodes 306 (AN) and Service nodes (SN) 308 residing in subsystems like 300 and 350. Key H_IN 302 functionality may include providing client nodes (AN 306 or SN 308) a direct access to services without having to disclose the location of the latter (e.g., transparent at the top level). All communication establishment may be connection-oriented, meaning that before any service or data communication may take place, connection setup procedures must first be carried out. Security features have been added to countermeasure identified threats. NoTA is an architecture that may be used to provide inter-device service access, making it possible to build independent subsystems providing both services and applications. In an exemplary implementation there may be several individual NoTA devices involved in direct inter subsystem communication.

Figure 3B:
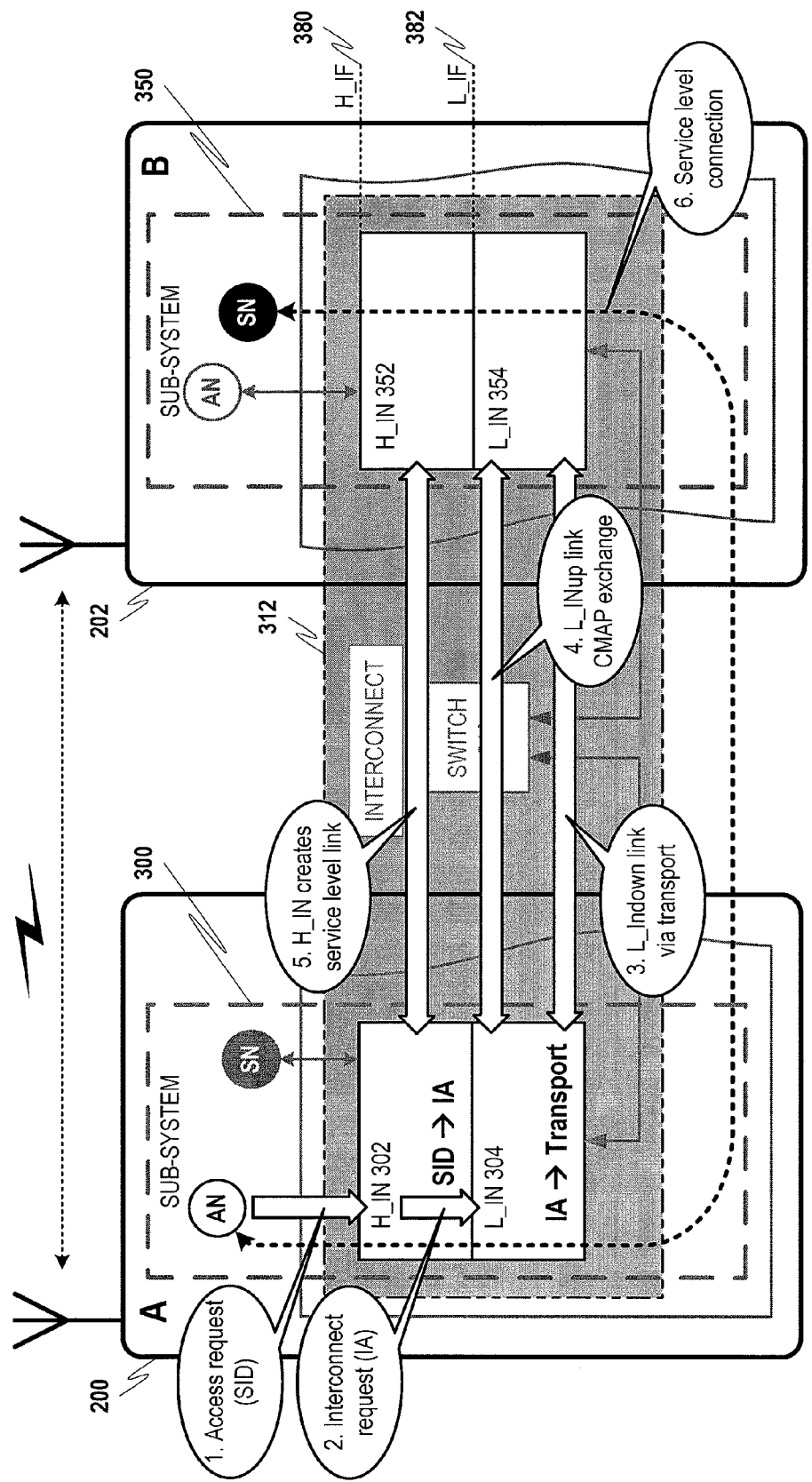
FIG. 3B discloses an example of establishing access to a target service residing in another device in accordance with at least one exemplary embodiment of the present invention.

Utilizing the previously described architecture, an example of establishing access to a service on another device via a wireless link, in accordance with at least one exemplary embodiment of the present invention, is disclosed in FIG. 3B. A node in the application/service level of subsystem 300 in device 200 desires to access a service. The service may be identified, for example, by a service description (SID). This service description may be used to locate and establish access to the desired service. In the H_IN level, the SID may be mapped to an Interconnect Address (IA) that may further identify the subsystem in which the service resides. In this example, the desired service resides in subsystem 350 in target device 202. In order to make an H_IN level connection with the subsystem offering this service, a transport must be selected that is suitable for making a connection between the devices. The IA may then be mapped to the selected transport in L_IN 304. In the example of FIG. 3B, a wireless link must be established because the devices are not coupled by a wired connection. This wireless link is established over interconnect 312 via the wireless transport. Once devices 200 and 202 are wirelessly coupled, H_IN level connection between subsystem 300 and 350 may be possible. In H_IN level 352 a corresponding H_IN protocol is usable to negotiate service usage. The (SID→IA) and (IA→transport) mapping is used only in subsystem 300 in order to build a connection with a proper subsystem offering the needed service (e.g., subsystem 350). As a result, upper level (e.g., application/service level) access may be established from a requesting node in device 200 to a service that is able to fulfill the request, even though the service resides in device 202. This access may be facilitated by lower level link establishment via one or more transports.

III. Exemplary Connection Management Structures

The present invention, in accordance with at least one embodiment, may be described in terms of the functionality of various architecture components and component relations. FIG. 4 describes the interaction of the various communication levels and examples of functions that may be performed by each level and its corresponding interface in accordance with at least one exemplary embodiment of the present invention. For example, 400 discloses an exemplary service node (SN) that may facilitate the set-up and establishment of connections supporting various application nodes (AN) such as 108 shown in FIG. 1A. The interface between the top application level and the H_IN level 404 may provide service access, registration and communication stream access via H_IF interface level 402. In accordance with at least one exemplary embodiment of the present invention, services may be identified by a Service Identification (SID). IN level 404 may then obtain device-to-device access and communication interface access to L_INup level 408 via L_IF interface level 406. The H_IN level access may be identified by an Interconnect Address (IA) which separates different devices/subsystems in high level middleware layer. A general connectivity control interface L_IFdown level 410 may then provide access from transport-independent L_INup level 408 to L_IN down 412 including transport specific L_IN adaptors as disclosed at 414. In various embodiments of the present invention, there may be a specific L_IN adaptor 414 for each communication medium (e.g., transport 418), each being linked by transport specific control interfaces 416. Wired and/or wireless transports 418 supported, for example in a mobile device, may then utilize the physical hardware and/or corresponding software in device PHY layer 420 to communicate. Overall, the service level may utilize an SID to identify different services, H_IN level middleware layer may then map this SID into a certain IA, which corresponds to an address of a device/subsystem where the respective service may be accessed in the high level middleware layer. L_INup level 408 may then map this IA to one or more physical connections (e.g., transports) that may offer connectivity to the device/subsystem that corresponds to the IA. L_INdown level 410 may then establish physical connections with the specific transport.

FIG. 5 depicts an exemplary low interconnect architecture (L_IN) 304, in accordance with at least one exemplary embodiment of the present invention. L_IN 304 may provide service upwards to H_IN 302 via L_IF interface 382, and may comprise a unified L_INup communication structure 408 and one or more L_INdown communication structures 412. L_INdown 412 may further include at least one L_INdown adaptor 414 corresponding to each transport 418 that may be utilized in a device. As a result, L_INup 408 may be transport independent (e.g., L_INup operation does not change in dependence upon the transport in use), while L_INdown adaptors 414 in L_INdown 412 may be specifically configured for use with each transport 418. Each L_INdown adaptor 414 may provide service to L_INup 408 through one or more L_IFdown interface 410. L_IFdown interfaces 410 may be configured similarly for each transport 418 except in the addressing and access mechanism.

L_INup 408 may perform multiple functions in embodiments of the present invention. For example, activation and deactivation may be controlled in this layer of the communication structure. The L_IN activation process is controlled over the L_IF 382. During the activation process, the L_IN 304 may be configured to be able to use wireless and/or wired transports as L_IN transports. As a result of successful activation, L_IN 304 may then be able to resolve an Interconnect Address (IA) as well as IAs for the existing Resource Managers (IArm). L_INup 408 may use the query services provided to L_INdown 412 during this activation.

When active, L_IN 304 may be able to detect loss of a L_IN network connection. As a result, any earlier allocated IA and IArms may be released in order to, for example, automatically reconnect the network connection using the same or a different transport. The deactivation process is also controlled over L_IF 382. In the deactivation process, L_IN 304 is deactivated in respect of all available transports. During this process, the IA is released.

Figure 6:
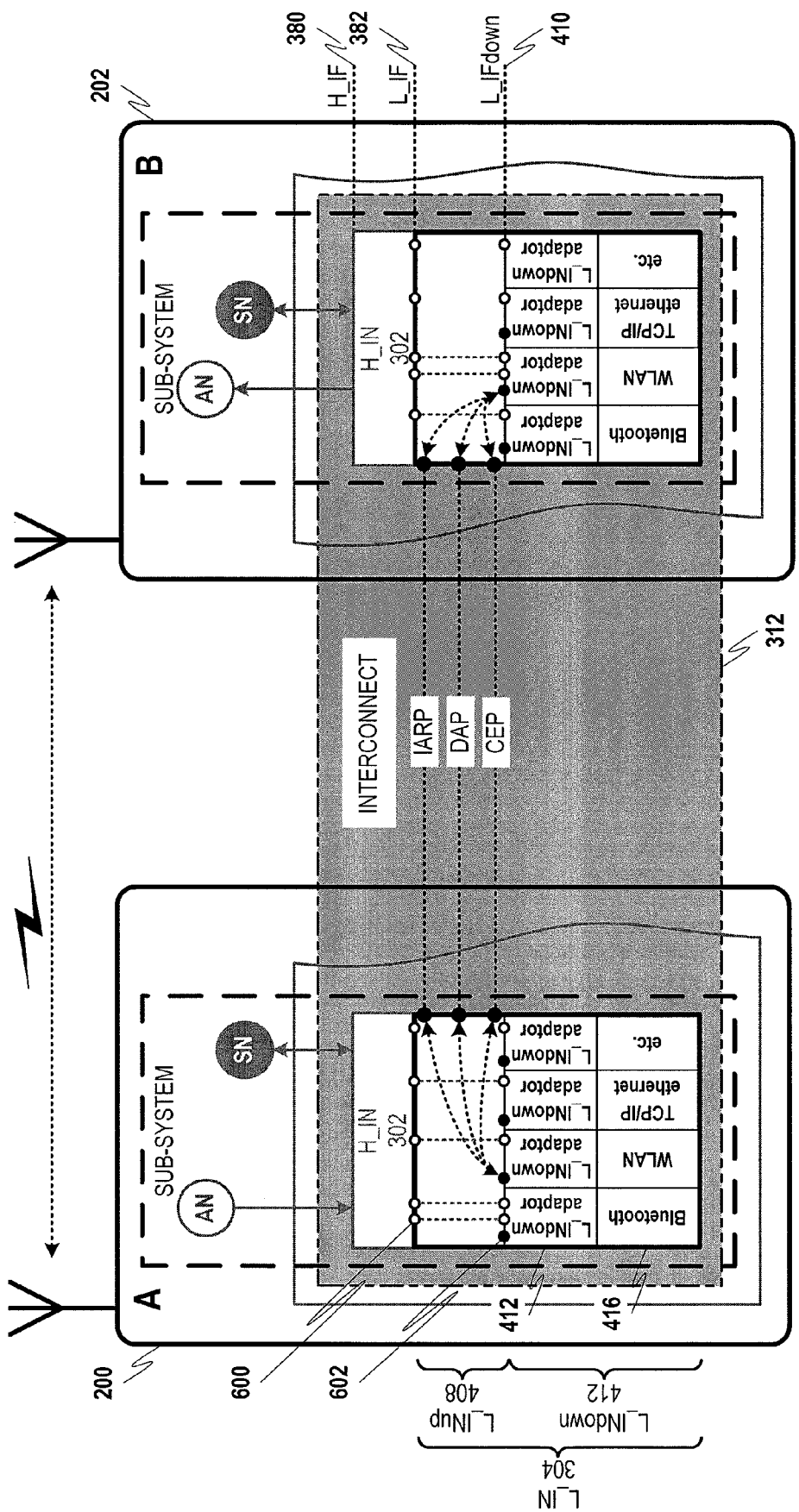
FIG. 6 discloses an example of connection establishment in accordance with at least one exemplary embodiment of the present invention.

The L_IN connection creation process may establish a L_IN-level connection between different devices such as shown in FIG. 6. This connection may utilize different types of transport technologies in-between the end-points. In general, the choice of transport may be transparent at the application level, since interfaces with which the nodes may interact may be transport-independent. However, there may be instances where applications and services (e.g., represented in the NoTA architecture by AN 306 and SN 308) may have requirements, or desired characteristics, regarding the connectivity that L_IN layer 304 may provide. L_IF interface 382 may therefore be equipped with a mechanism to enable a quality of service (QoS) parameter setup to monitor each connection. At this level, the quality of service parameters may not be bound to an actual transport since the transport technology used to carry out data would not be selected at this level. Rather, the QoS requirements may be mapped to an L_IN communication instantiation, or "socket," that are abstractions of the actual connection that upper protocols may use. The connectivity requirements may be achieved using, for example, buffer state-based transport selection and flow control. The interface does not have to address transport specific parameters. Instead the requirements, or wishes, may be described in more universal manner.

In order for L_IN to carry out its function, a set of basic L_INup-L_INup connection protocols may be defined. All of these may be utilized by the L_INup communication structure 408, hence making the implementation of the L_INdown adapter 412 simple (e.g., because no generic L_INdown-L_INdown peer protocols are required). The following L_INup protocols may be defined for facilitating communication between L_IN communication structures existing in two separate devices (e.g., devices 200 and 202 as shown in FIG. 6):

A protocol that may provide a means to allocate and identify unique interconnect addresses for each device may be called an Interconnect Address Resolution Protocol (IARP) in accordance with at least one exemplary embodiment of the present invention.

A protocol that may provide a means to establish data connection establishment and disconnection between sockets may be called the Device Access Protocol (DAP) in accordance with at least one exemplary embodiment of the present invention.

A protocol that may provide a means to exchange connectivity map-type information between devices. This information (e.g., regarding connectivity in the device environment) may further be utilized to select optimal connectivity method when distributing information across the devices. This protocol may be called the Connectivity Environment Protocol (CEP) in accordance with at least one exemplary embodiment of the present invention.

IARP may be specified to provide inter-device NoTA architecture Interconnect Address (IA) resolution within a network of devices, in an ad-hoc communication connection, etc. IARP may contain four messages in order to retrieve and release a unique IA. In the example of FIG. 6, the IA resolution process may handle IA address allocation between devices as a connection is established. Address resolution may utilize IARP as a resource for supporting connection establishment. Address resolution may be centralized or distributed/autonomous requiring zero manual configuration. The data delivery process may manage data flow control between the sending device and the receiving device. L_IF ring-buffer based sockets may be used in this process. The data delivery process may further implement connection loss detection and recovery process in order to provide more reliable data delivery using inter-transport switching.

DAP may provide connectivity initialization, creation, and disconnection. L_IN layer internal interface, L_IFdown 410, may provide uniform way for DAP to access individual transports. Each transport needs an adaptor 412 which implements L_IFdown interface 410. FIG. 6 shows how the architecture scales from a transport independent intra-device domain (e.g., L_INup 408) to transport independent inter-device domain (e.g. L_INdown 412). For example, the depicted communication layers may be coupled data sockets 600 that may directly couple H_IN 302 and L_INdown 412 via transport-independent L_INup communication structure 408.

Inter-transport switch triggering decisions may be controlled in view of condition information obtained by monitoring the transmit (TX) and receive (RX) buffer fill levels. All data conveyance may be considered "Best Effort" (BE) type. Introduction of some simple QoS classes (e.g. BE, low-latency delivery, minimized power consumption, etc.) may then be possible while still keeping the overall implementation complexity of NoTA manageable. The connection loss and recovery process is a supplemental action in L_IN communication structure 304 that can be utilized for restoration and reconnection procedures that could not otherwise be handled in as part of the inherent abilities of resources operating at the transport level.

Part of the connection setup, data delivery, and connectivity recovery solutions may include sharing and distributing information about the connectivity in the surrounding environment by means of the CEP protocol. This method may retrieve information about the available connectivity technologies used by other surrounding devices and enables smart decision making procedures when choosing optimal transport to access devices and services. In FIG. 6, control sockets 602 for enabling L_INup-to-L_INup protocol communication are shown interacting with the IARP, DAP and CEP protocols in furthering inter-device communication.

The L_INdown communication structure 412 may provide other communication-related functionality. For example, a query operation may be an L_INdown internal function that is intended to provide information concerning transport specific connection opportunities. This functionality may be tightly coupled with scene and connectivity maps by which information regarding the overall space/proximity/neighborhood connectivity may be obtained. The query function is mainly employed during the establishment of a connection.

A data delivery process may handle data flow control between the same transport peer entities (e.g., between L_IN up communication structures such as shown in FIG. 6). The same ring buffers may be used as in the previously described case with respect to L_IF. A transport specific connection loss and recovery process may also be implemented in L_INdown 412. The implementation may substantially depend on the applied transport technology.

Figure 7:
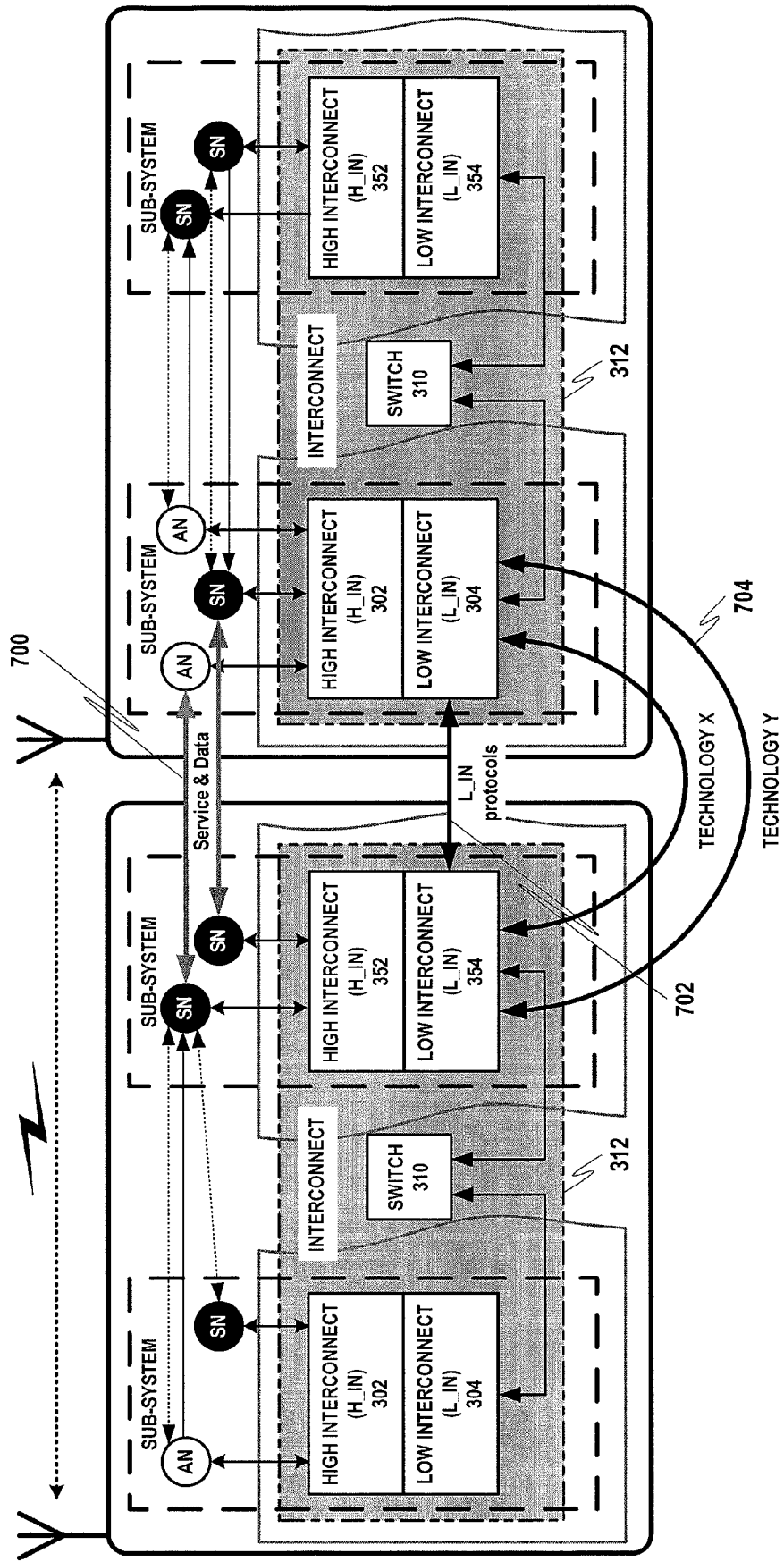
FIG. 7 discloses an example of multi-subsystem inter-device connection establishment in accordance with at least one exemplary embodiment of the present invention.

FIG. 7 discloses an implementation example in an exemplary scenario, wherein each device may include multiple internally coupled subsystems that are then wirelessly coupled in accordance with at least one embodiment of the present invention. In the disclosed example, one or more transport technologies may be utilized alone or in combination as shown at 704. These transport technologies may, in many cases, be implemented without any visibility being required to the application level since the interfaces by which the application level may access these communication services do not change based on the transport utilized.

A transport independent connection may be formed between the L_INup layers in each device using, for example, the aforementioned connection protocols is shown at 702. This transport-independent link between devices may provide stabile and unchanging communication link that perpetuates the exchange of service and data communication between the devices as shown at 700. As a result of this communication interface architecture, flexible connection strategies may be employed to wirelessly couple the devices that may vary depending on the situation. For example, concurrent use of multiple transports may create a faster communication rate. Further, if a transport were to fail or become interrupted, then the original socket may be discontinued and replaced with a socket in the same transport or an alternate transport without risking disruption of higher-level NoTA operation (e.g., in the application or service node level).

Figure 8A:
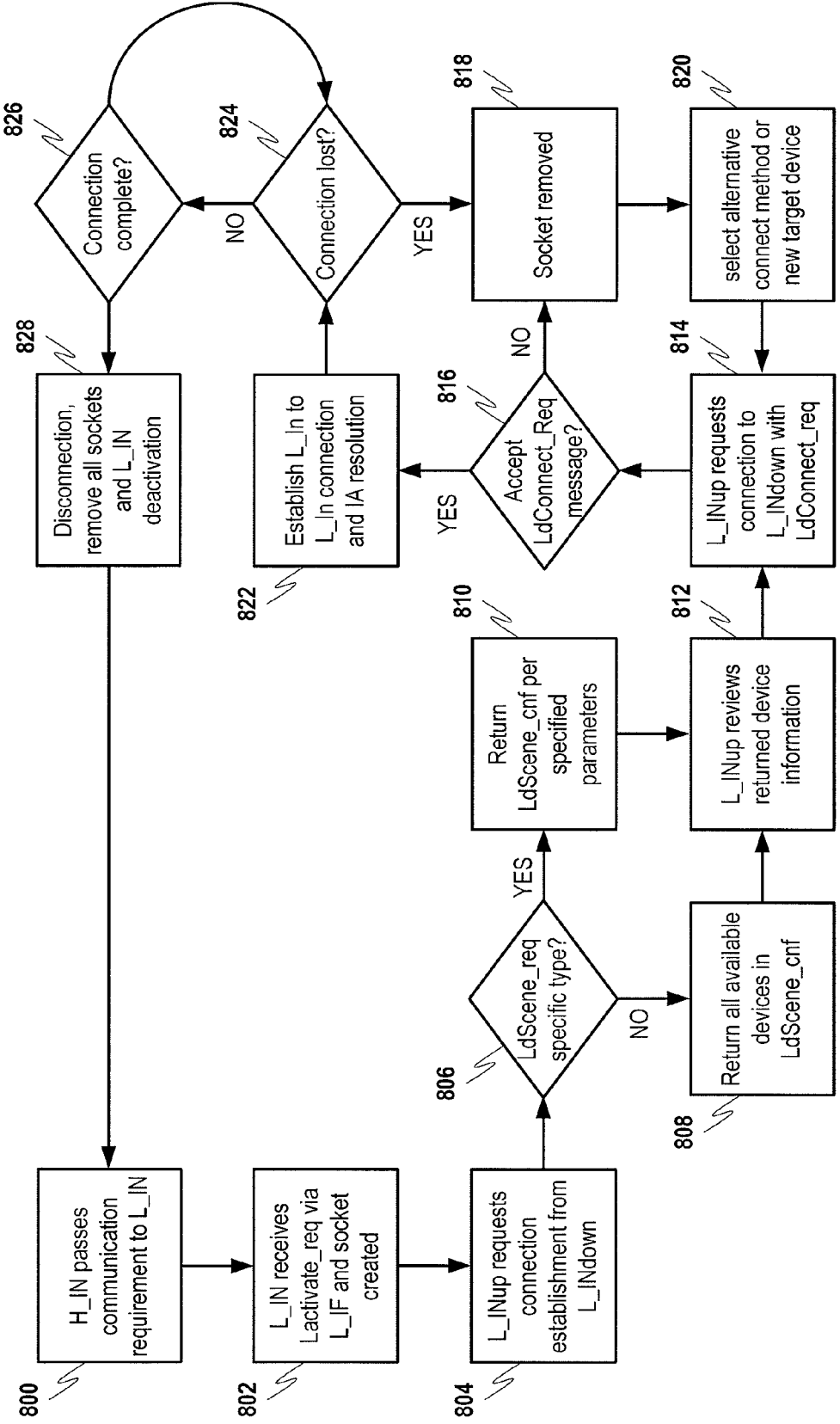
FIG. 8A discloses a flowchart of an exemplary communication establishment process in accordance with at least one exemplary embodiment of the present invention.

FIG. 8A discloses a flowchart for an exemplary process in accordance with at least one exemplary embodiment of the present invention. The process may start at step 800 with L_IN activation. After activation, the L_IN can be used to exchange L_IN user (e.g. H_IN) messages wirelessly (and/or by wired means). After the L_INup has received Lactivate_req over the L_IF in step 802, the L_INup is ready to perform needed operation to build up wireless L_IN-L_IN connection. For this purpose LdOpen_req may create a control socket for L_INup control purposes.

In this specific example it is assumed that L_INup does not have knowledge where to connect so first operation is a query. With an LdScene_req message, L_INup may ask L_INdown to provide information of some devices using one selected technology in step 804. Using various parameters, L_INup can instruct L_INdown to search for devices which have specific characteristics such as only Resource Manager (RM) devices, all NoTA devices or any device capable of performing the required transaction (e.g., via a specific transport). These instructions may be interpreted in step 806, and according to this message L_INdown perform transport specific query operation and returns device information that matches to the parameters given in LdScene_req. If no specific characteristics are specified, then in step 808 all discovered devices may be returned. If certain parameters were specified, then in step 810 only devices that match the characteristics of the target specification may be returned. It should be noted that in here a first device (e.g., a service device) may be put in active mode with query parameters, where a second device may be put in a "listening" mode with scan parameter. This means that the second device may not be actively searching for any devices but is available for connection creation.

Regardless of the query information that is returned, this information may be reviewed in step 812 to determine an appropriate target device from all of the available devices that were discovered.

In the L_IN connection creation process, L_INup may use information returned by the LdScene_cnf (or alternatively information that might already exist on the device) to create connection with at least one other device. In this example, a connection may be created with a NoTA device having RM. An LdConnect_req message from L_INup may instruct L_INdown to create connection with a target device in step 814. L_INdown may then attempt to create a connection with the desired device in step 816. If for some reason the connection is not accepted in step 818, then in step 820 the L_INdown socket created earlier in the process is removed and the selection of an alternative connection method (e.g., using another transport) or an alternative target device may occur. The connection request process may then repeat starting in step 814 until the connection is accepted by another device in step 816. After the connection is created the second device may receive an LdConnect_ind message which may be implicitly accepted. After successful socket (connection) creation, L_INup-L_INup connection may be utilized.

IA resolution may further be completed in step 822, which may be performed on the L_INup-L_INup level. An L_INup peer protocol message may be sent out by a device which needs an IA for the inter-device operation. Another device may then return an IA in response to this request. After IA resolution completes, a confirmation activation cnf may be sent (L_IF). The communication may continue until the connection is lost or the communication is complete. Step 824 deals with the loss of the connection. A connection loss indication may be used to indicate to the situation to L_INup for the lost connection or device in the case it can not be managed by L_INdown. After receiving this notification, L_INup can decide what is the operation needed to recover/rebuild the connection. The recovery process may include returning from step 824 where connection is lost to step 818 to remove the existing L_INdown socket and replace the method of connection or the target device as previously described with respect to step 818.

When the connection is determined to be complete in step 826, a disconnection procedure may be executed in step 828. In the disconnection procedure, a connection formed using a specific transport or certain coupled device may be disconnected. In a normal procedure all the connections may first be removed before disconnecting whole device (e.g., all of the sockets are removed first before disconnecting the device in total). After all coupled devices have been disconnected the L_IN deactivation can be performed. The process may then return to initial step 800 to await the next communication activity requiring connection establishment.

Figure 8B:
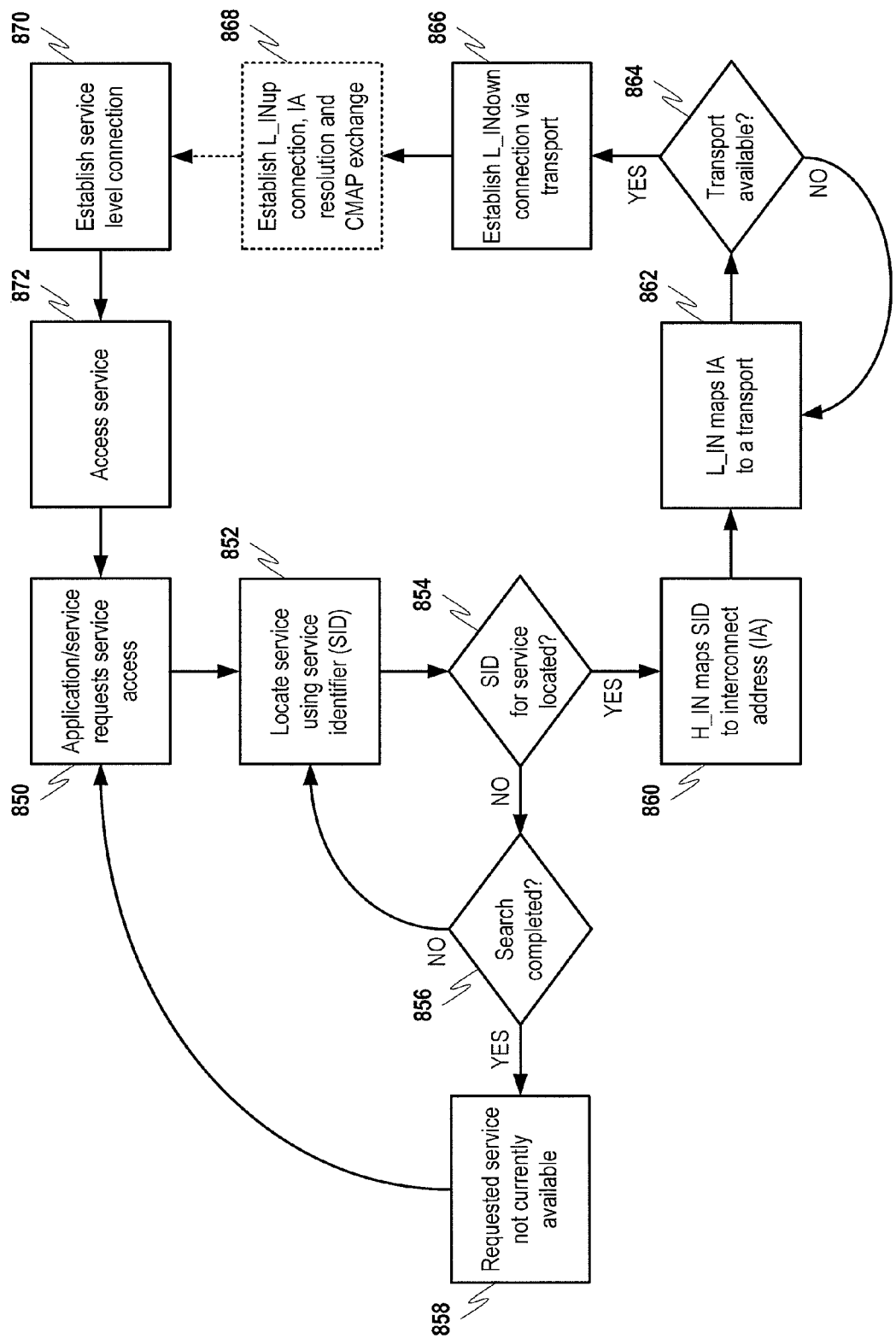
FIG. 8B discloses a flowchart of an exemplary communication routing process in accordance with at least one exemplary embodiment of the present invention.

Referring to FIG. 8B, a flowchart disclosing a communication routing example in accordance with at least one exemplary embodiment of the present invention is now disclosed. In step 850, an application or service (e.g., represented by a node at the application/service level) may request service access. A requested service may be identified, for example, through the use of a service identifier (SID). A search may occur in step 852 utilizing the requested service SID.

The search may be executed using, for example, a service like billboard 124 as previously discussed with respect to FIG. 1B. Another possibility is that the service search is done prior to the access request, which means that a service list (including services available on other devices) may already be available when service is accessed. If the service is not located in step 854, then a determination may be as to whether the search has been completed in step 856. If the search is complete, the conclusion that the requested service is not currently available made by made in step 858, at which point the search may terminate and return to step 850 to await the next service request. The termination of the search may be based on limiting factors such as end of list, timeout, number of attempts, etc. If the requested service is located in a subsystem, then the process may proceed to step 860 where connection establishment may begin.

In step 860, the H_IN level may map the SID to an interconnect address (IA). The IA may indicated both the subsystem in which the requested service resides and the device where the subsystem may be found. The L_IN level may then map the IA to a particular transport in step 862. For example, if the devices are coupled by a wired local area network (LAN), then a suitable transport may be Ethernet. However, if the devices are not connected via wires, then a wireless transport may be more suitable. Transports may further be selected based on speed, error correction, transmit range, power consumption, etc. The process may continue to search for a suitable transport in steps 862-864 until a suitable (and available) transport is determined.

In accordance with at least one exemplary embodiment of the present invention, the selection of a transport may include a prioritization of the transports based on their characteristics, for example, by comparing the transport characteristics to the needs of the application and/or service initiating the access request. Based on this comparison, the transports may be ordered accordingly, and the most preferred transport may be selected as shown in steps 862-864. In an instance where the most preferred transport cannot be used, the next preferred transport in the order may be selected and subjected to the transport selection. This process may be repeated until a suitable and available transport is found. Further, according to at least one exemplary embodiment, the general state of the device, including e.g., battery power level and other operational characteristics may also be considered in the prioritization of the transports.

In step 866 the L_INdown level may establish a low-level connection to the device on which the desired subsystem/service resides. This low-level link may be made to the corresponding L_INdown of the other device. After the initial connection is established, the L-INup level in each device may form a mid-level connection (e.g., also called middleware) in step 868. Step 868 has been shown as optional in FIG. 8B, as it may only be implemented when applicable or needed. This mid-level connection may be used to, for example, resolve the IA of the desired subsystem and exchange Channel map (CMAP) information. Following completion of L_INup connection establishment (if required), an upper level (e.g., service level) link may be established in step 870, and this upper level connection may in turn be used to grant access to the requested service in step 872. The process may then return to step 850 to await the next request.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   receiving, in a first apparatus, at a high level transport-independent interconnect in a common memory space, an access request including at least one indicator identifying one or more services or applications in a second apparatus, wherein the access request is transport-independent;
   mapping, in the first apparatus, the received at least one indicator to at least one interconnect address at the high level transport-independent interconnect, the at least one interconnect address indicating one or more subsystems corresponding to the one or more services or applications in the second apparatus, and the interconnect address being inserted into the transport-independent access request;
   passing, in the first apparatus, the access request to a low level interconnect in the common memory space in the first apparatus, wherein the low level interconnect includes at least a transport-independent interconnect adaptor and a plurality of transport-specific interconnect adaptors;
   mapping, in the first apparatus, at the transport-independent interconnect, one of the plurality of transport-specific interconnect adaptors-capable of providing access to the one or more subsystems corresponding to the one or more services or applications in the second apparatus, based on the at least one interconnect address in the access request; and
   establishing, in the first apparatus, at the mapped transport-specific interconnect adaptor, a connection to access the one or more requested services or applications in the second apparatus, using one of a plurality of transports associated with the mapped transport-specific interconnect adaptor.

2. The method of claim 1, wherein the one or more transport-specific interconnect adaptors correspond to each transport supported in a device.

3. The method of claim 1, wherein a socket is created for a transport-specific interconnect adaptors corresponding to a wireless transport supported by a device.

4. The method of claim 3, wherein the socket is erased and replaced with a new socket if the requested communication connection is rejected.

5. The method of claim 1, further comprising managing the connection by reestablishing the connection if it becomes broken.

6. The method of claim 5, wherein reestablishing the requested connection includes creating a new socket pertaining to at least one transport-specific interconnect adaptor corresponding to a transport supported by a device.

7. A computer program product comprising a non-transitory computer usable medium having computer readable program codes recorded in said medium, comprising:
   a computer readable program code configured to receive, in a first apparatus, at a high level transport-independent interconnect in a common memory space, an access request including at least one indicator identifying one or more services or applications in a second apparatus, wherein the access request is transport-independent;
   a computer readable program code configured to map, in the first apparatus, the received at least one indicator to at least one interconnect address at the high level transport-independent interconnect, the at least one interconnect address indicating one or more subsystems corresponding to the one or more services or applications in the second apparatus, and the interconnect address being inserted into the transport-independent access request;
   a computer readable program code configured to pass, in the first apparatus, the access request to a low level interconnect in the common memory space in the first apparatus, wherein the low level interconnect includes at least a transport-independent interconnect and a plurality of transport-specific interconnect adaptors;
a computer readable program code configured to select, in the first apparatus, by the transport-independent interconnect, one of the plurality of transport-specific interconnect adaptors based on the at least one interconnect address, the selected transport-specific interconnect adaptor corresponding to a particular one of a plurality of transports; and
a computer readable program code configured to establish, in the first apparatus, access to the requested service or application in the second apparatus, using the one of a plurality of transports associated with the one of a plurality of transport-specific interconnect adaptors.

8. The computer program product of claim 7, further comprising a computer readable program code configured to create a socket for a transport-specific interconnect adaptor corresponding to a transport supported by an apparatus running the computer program product.

9. The computer program product of claim 8, further comprising a computer readable program code configured to erase and replace the socket with a new socket if the requested communication connection is rejected.

10. The computer program product of claim 7, further comprising a computer readable program code configured to reestablish the requested communication connection if it becomes broken.

11. The computer program product of claim 10, wherein reestablishing the requested communication connection includes creating a new socket pertaining to at least one transport-specific interconnect adaptor corresponding to a transport supported by the device.

12. A device, comprising:
a plurality of transport-specific interconnect adaptors that are network interfaces configured to support a plurality of wireless transports; and
a processor coupled to the plurality of transport-specific interconnect adaptors, the processor being configured to instruct one or more operational elements of the device to:
receive an access request including at least one indicator identifying one or more services or applications in a second device, in a high level transport-independent interconnect in a common memory space, wherein the access request is transport-independent;
map the received identification to at least one interconnect address at the high level transport-independent interconnect, the at least one interconnect address indicating one or more subsystems corresponding to the requested one or more services or applications in the second device, and the interconnect address being inserted into the access request;
pass the access request to a low level interconnect in the common memory space in the device, wherein the low level interconnect-includes at least a transport-independent interconnect and the plurality of transport-specific interconnect adaptors;
select, by the transport-independent interconnect, one of the plurality of transport-specific interconnect adaptors based on the at least one interconnect address, the selected transport-specific interconnect adaptor corresponding to a particular one of a plurality of transports; and
establish access to the requested one or more services or applications in the second device, using the one of a plurality of transports associated with the one of a plurality of transport-specific interconnect adaptors.

13. The device of claim 12, wherein each of the plurality of transport-specific interconnect adaptors-corresponds to each of the plurality of transports supported by the device.

14. The device of claim 12, wherein establishing the requested communication connection includes establishing the requested communication connection in accordance with parameters passed to the low level interconnect.

15. The device of claim 12, wherein the processor is further configured to instruct one or more operational elements of the device to create a socket for a transport-specific interconnect adaptor corresponding to a transport supported by the device.

16. The device of claim 15, wherein the processor is further configured to instruct one or more operational elements of the device to erase and replace the socket with a new socket if the requested communication connection is rejected.

17. The device of claim 12, wherein the processor is further configured to instruct one or more operational elements of the device to reestablish the requested communication connection if it becomes broken.

18. The device of claim 17, wherein reestablishing the requested communication connection includes creating a new socket pertaining to at least one transport-specific interconnect adaptor-corresponding to a transport supported by the device.

* * * * *